P. F. HAMBSCH.
RANGE FINDER.
APPLICATION FILED JAN. 10, 1910.

1,001,844.

Patented Aug. 29, 1911.

Witnesses

Inventor
Philip Frederic Hambsch
By his Attorneys

UNITED STATES PATENT OFFICE.

PHILIP FREDERIC HAMBSCH, OF BURLINGTON, IOWA.

RANGE-FINDER.

1,001,844.  Specification of Letters Patent.  Patented Aug. 29, 1911.

Application filed January 10, 1910. Serial No. 537,102.

*To all whom it may concern:*

Be it known that I, PHILIP FREDERIC HAMBSCH, a citizen of the United States, and a resident of Burlington, in the State of Iowa, have invented certain new and useful Improvements in Range-Finders, of which the following is a specification, reference being had to the accompanying drawings, forming a part hereof.

The object of the invention is to provide a range finder of considerable accuracy and one that may be operated readily and swiftly.

The range finders in use at the present time on naval vessels employ, as a rule, a relatively small base near at hand, and the calculations or readings adduced under such circumstances are not as accurate as could be wished, particularly when measuring distances of considerable length. In accordance with the present improvements, instead of employing a relatively small base near at hand and from which to make the measurements, the ship or other object the distance to which is to be measured, is itself employed as the base, and high power telescopes are used in order that the instrument may be accurately fixed or set upon the distant object.

Figure 1:
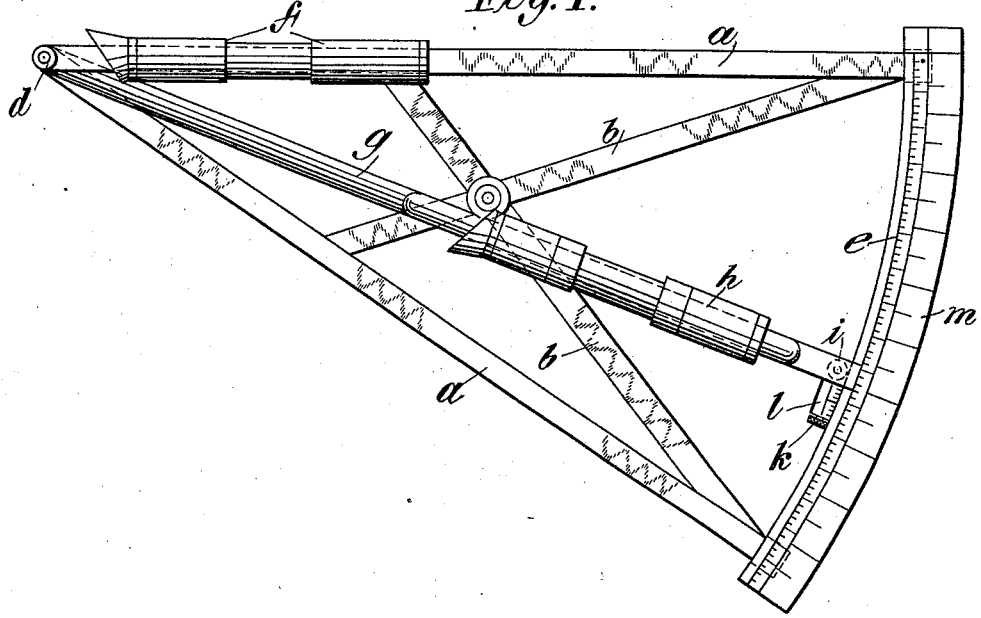
Figure 2:
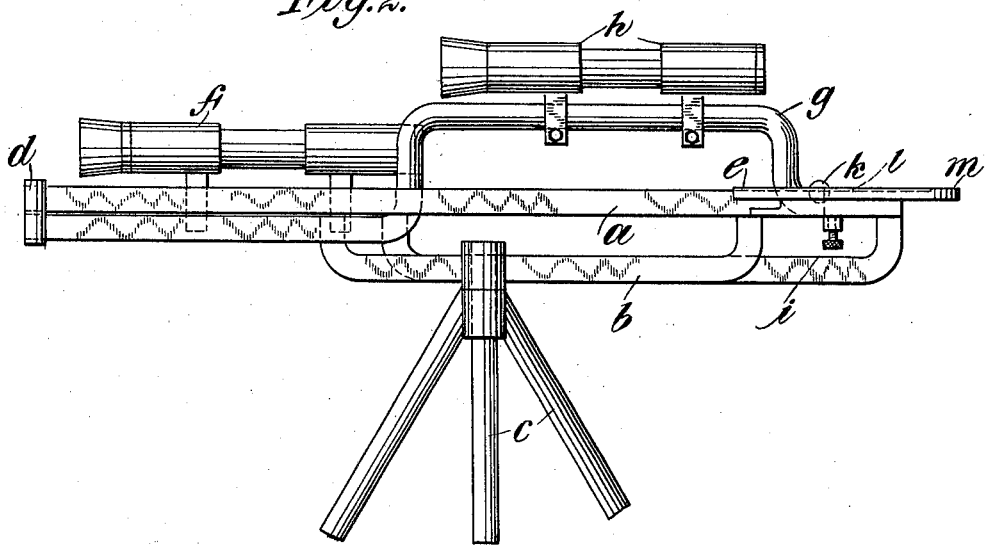

The improvements will now be particularly described in connection with the accompanying drawings, in which, Figure 1 is a plan view of an instrument embodying the same, and Fig. 2 is a view in side elevation.

The instrument shown in the drawings has a triangular frame consisting of the side bars $a$ and cross bars $b$, and this frame may be mounted to turn in any suitable manner upon a support $c$. The side bars $a$ diverge from the vertex $d$ to an arc $e$, the latter, in the present case, being shown as about 30° in length.

Upon one of the side members of the frame, preferably upon the left hand member as viewed from the vertex $d$, a high power glass or telescope $f$ is fixedly secured. The arrangement of this telescope is such that its central line or axis cuts across the vertex $d$ of the frame and also across the zero of the scale with which it will be understood the arc $e$ is provided. Pivoted at the vertex $d$ and with its free end movable upon the arc or scale $e$ is an arm $g$ the intermediate portion of which is preferably raised above the plane of the instrument and is provided with a second telescope $h$, of high power as in the case of the first telescope, and also mounted so that its axis or central line cuts across the vertex $d$. The end of this arm is provided with a suitable set screw $i$, tangent screw $k$ and vernier $l$, as in the case of a sextant, for fastening the arm in position, for making fine adjustments thereof and for reading the scale, all as will be readily understood.

When now it is desired to obtain the range or distance of a vessel at sea, the operator, with the instrument in a horizontal position as shown in the figures, fixes the vertical cross-hair of the telescope $f$ upon one end of the vessel and holds it there while another operator moves the arm $g$ until the vertical cross-hair of the telescope $h$ exactly coincides with the other end of the vessel. Assuming now that the vessel is presented broadside on to the instrument, then it will be easy to calculate with considerable accuracy, if the vessel's length be known, how far distant the vessel is, the formula being: distance equals length of vessel divided by tangent of angle of divergence between the telescopes. It will thus be possible to calculate, for a given base, such as a vessel of known length, the distances which correspond to different divergences between the telescopes. In this way a range card $m$ may be provided for a given base which shall contain or specify the distances corresponding to the degrees upon the arc, and if these distances are set opposite the corresponding degrees, it will be obvious that any distance may be read off at once as soon as the sighting has been effected. And where an instrument of this sort is provided upon the fire control mast of a battleship, the observed distances may be quickly communicated to the firing turrets.

As the lengths of battleships are well known, it will be seen that the present improvements may be very conveniently employed in naval warfare. For this purpose a series of range cards will be calculated and provided for different lengths of bases so that it will be possible, when a given vessel arrives within sighting distance, to insert the appropriate range card upon the arc of the instrument and then to definitely measure the distance to the vessel. In preparing each range card, it will be preferable to provide readings for every 100 yards from 10,000 yards to 7,000 yards inclusive and to provide readings for every 50 yards from 7,000 yards to 1,000 yards inclusive. In every series of range cards there should not only be a card corresponding to a given base, but in addition a card corresponding to this base presented at an angle of 30°, a card corresponding to the same base presented at an angle of 45°, and a card corresponding to the same base presented at an angle of 60° from the broadside position thus making a total of four cards for a given base. Obviously, however, inasmuch as a given base at one of these angles may present the same apparent base as a different base arranged at broadside on to the instrument, one or more of the range cards calculated for a given base may be identical with other range cards calculated for different bases. Thus it will be possible to use one card under different conditions. It will be understood also that the particular angle to the broadside which is presented by a boat as it comes within sighting distance will be determined approximately by the operators in the fire control tower previously to using the range finder. Moreover, advantage can be taken of the general line formation of a fleet in order to determine the distance of the fleet for, as is well known, war vessels generally travel about 400 yards apart, this distance being oftentimes maintained with considerable accuracy. In such a case, to measure the distance of a line of vessels, this 400 yard base may be used by fixing the telescope, the one upon the forward end of one vessel and the other upon the rear end of the preceding vessel. It will be obvious that the large base thus afforded will make the readings of the instrument very accurate indeed. Finally, if the vessel is presented head on or stern on, the beam of the vessel may be taken as the base.

It will be understood that various changes may be made in the present embodiment of the improvements without departing from the spirit of the invention. It will be understood too that where the word telescope is used in the claims, it should be taken to refer broadly to a field glass of any suitable form.

I claim as my invention:

1. A range finder having a support, a frame, a telescope fixed to the frame, a second telescope movable relative to and carried by the frame and means from which a reading can be taken when the second telescope is moved relative to the first mentioned telescope, the frame being movably mounted upon the support so that the first mentioned telescope can be continuously sighted upon a moving distant object.

2. A range finder having a support, a frame pivotally mounted thereupon, high power telescopes carried by the frame, one of the telescopes being movable relative to the frame and to the other telescope which is relatively fixed to the frame, the frame being pivotally mounted upon the support in such manner as to permit the telescope which is relatively fixed to the frame to be continuously sighted upon a moving distant object.

3. A range finder having a support, telescopes carried on a frame so as to permit of movement relative to the support so that they can be continuously sighted upon a moving object, at least one of the telescopes movably mounted on the frame so that they can be moved relative to each other and means therebetween whereby when the telescopes are sighted upon opposite portions of a known length of an object, a predetermined reading can be taken from the means.

4. The combination of a support, a horizontally movable frame mounted thereupon, telescopes having vertical cross wires carried by the frame, one of the telescopes being fixed upon the frame and the other movably mounted upon the frame, the lines of sight located in vertical planes which intersect at the rear or eye end of the instrument, a scale over which the outer or object end of the relatively movable telescope travels, said scale so marked as to give a predetermined reading when the telescopes are sighted upon opposite ends of an object.

5. A range finder having a telescope carried on a movable frame and fixed thereto, a telescope carried on the frame and movable relative thereto, and a range card upon which distances corresponding to different divergences between the telescopes have been set down for a given base.

6. A range finder having a telescope fixed to a movable frame, a movable telescope mounted so as to be pivoted at a point in line with the first mentioned telescope, and an arc along which the second telescope travels and the zero of which is pierced by the line of the first mentioned telescope.

7. A range finder having a movable triangular frame, telescopes, one fixed to and the other movable relative to the frame and diverging from the vertex thereof, and an arc movable with the frame over which the relatively movable telescope travels.

8. The combination of a range finder having a movable frame supporting a fixed telescope and a telescope movable relative thereto and a card specifying for a given base distances corresponding to different divergences between the telescopes.

This specification signed and witnessed this 5th day of January, A. D., 1910.

PHILIP FREDERIC HAMBSCH.

Signed in the presence of—
G. McGRANN,
JOHN W. THOMPSON.

Copies of this patent may be obtained for five cents each, by addressing the "Commissioner of Patents, Washington, D. C."